United States Patent
Song

(10) Patent No.: US 11,066,866 B2
(45) Date of Patent: Jul. 20, 2021

(54) METHOD AND APPARATUS FOR CONTROLLING MOTOR FOR SPEED REGULATOR POWER WINDOW

(71) Applicants: Hyundai Motor Company, Seoul (KR); Kia Motors Corporation, Seoul (KR)

(72) Inventor: Jae Man Song, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 238 days.

(21) Appl. No.: 16/186,081

(22) Filed: Nov. 9, 2018

(65) Prior Publication Data
US 2020/0102780 A1  Apr. 2, 2020

(30) Foreign Application Priority Data
Sep. 27, 2018 (KR) .................. 10-2018-0115106

(51) Int. Cl.
*E05F 15/71* (2015.01)
*H02P 29/00* (2016.01)

(52) U.S. Cl.
CPC .......... *E05F 15/71* (2015.01); *E05Y 2900/55* (2013.01); *H02P 29/00* (2013.01)

(58) Field of Classification Search
CPC ....... E05F 15/71; E05F 15/695; E05F 15/689; H02P 29/00; E05Y 2900/55
See application file for complete search history.

(56) References Cited

U.S. PATENT DOCUMENTS

| 5,321,345 | A | * | 6/1994 | Lambros | ................ B60J 7/0573 307/10.1 |
| 2016/0333627 | A1 | * | 11/2016 | Dudar | .................. H02H 7/0851 |
| 2018/0058127 | A1 | * | 3/2018 | Ikeda | ..................... E05F 15/689 |
| 2020/0087969 | A1 | * | 3/2020 | Lee | ......................... E05F 15/48 |

FOREIGN PATENT DOCUMENTS

| KR | 10-2005-0068407 A | | 7/2005 |
| KR | 1020050068407 | * | 7/2005 |

* cited by examiner

*Primary Examiner* — Nga X Nguyen
(74) *Attorney, Agent, or Firm* — Mintz Levin Cohn Ferris Glovsky and Popeo, P.C.; Peter F. Corless

(57) ABSTRACT

A method and an apparatus for controlling a motor for a speed regulator power window is provided. The motor for the power window is adjusted to operate with a maximum output when a user operates a switch if an external environmental state of a vehicle coincides with a configured reference condition. The output of the motor is adjusted to operate the window at one of a normal speed, a high speed, and a low speed set by the user when the external environmental state of the vehicle does not coincide with the configured reference condition.

9 Claims, 4 Drawing Sheets

FIG. 4

```
CASE1 - SET WINDOW SPEED REGULATOR TO NORMAL SPEED
        (BASED ON SETTING DURING VEHICLE SHIPPING)
    8V MOTOR OUTPUT AT INITIAL OPERATION TIME (A POSITION)
    300ms TIME FOR VOLTAGE INCREASING SECTION (A-B SECTION)
    11V MOTOR OUTPUT IN MIDDLE SECTION (MAXIMUM OUTPUT
                SECTION, B-C SECTION)
    4cm VOLTAGE DROPPING START TIME (C POSITION)
    50ms TIME FOR VOLTAGE DROPPING SECTION (C-D SECTION)
    4V MOTOR OUTPUT IN LAST OPERATION SECTION (D-E SECTION)
```

```
CASE2 - SET WINDOW SPEED REGULATOR TO HIGH SPEED (CONTROL TO
        INCREASE MOTOR OUTPUT AT INITIAL OPERATION TIME AND IN
        LAST OPERATION SECTION AS COMPARED WITH NORMAL SPEED,
        REDUCE VOLTAGE INCREASING SECTION TIME AND VOLTAGE
        DROPPING SECTION TIME, AND CONTROL TO INCREASE
        MAXIMUM MOTOR OUTPUT)
    10V MOTOR OUTPUT AT INITIAL OPERATION TIME (A1 POSITION)
    150ms TIME FOR VOLTAGE INCREASING SECTION
                (A1-B1 SECTION)
    13V MOTOR OUTPUT IN MIDDLE SECTION (MAXIMUM OUTPUT
                SECTION, B1-C1 SECTION)
    2cm VOLTAGE DROPPING START TIME (C1 POSITION)
    25ms TIME FOR VOLTAGE DROPPING SECTION (C1-D1 SECTION)
    6V MOTOR OUTPUT IN LAST OPERATION SECTION
                (D1-E1 SECTION)
```

```
CASE3 - SET WINDOW SPEED REGULATOR TO LOW SPEED (CONTROL TO
        DROP MOTOR OUTPUT AT INITIAL OPERATION TIME AND IN LAST
        OPERATION SECTION AS COMPARED WITH NORMAL SPEED,
        INCREASE VOLTAGE INCREASING SECTION TIME AND VOLTAGE
        DROPPING SECTION TIME, AND CONTROL TO DROP MAXIMUM
        MOTOR OUTPUT)
    6V MOTOR OUTPUT AT INITIAL OPERATION TIME (A2 POSITION)
    600ms TIME FOR VOLTAGE INCREASING SECTION
                (A2-B2 SECTION)
    9V MOTOR OUTPUT IN MIDDLE SECTION (MAXIMUM OUTPUT
                SECTION, B2-C2 SECTION)
    6cm VOLTAGE DROPPING START TIME (C2 POSITION)
    75ms TIME FOR VOLTAGE DROPPING SECTION (C2-D2 SECTION)
    2V MOTOR OUTPUT IN LAST OPERATION SECTION
                (D2-E2 SECTION)
```

METHOD AND APPARATUS FOR CONTROLLING MOTOR FOR SPEED REGULATOR POWER WINDOW

CROSS REFERENCE TO RELATED APPLICATION

The present application claims priority of Korean Patent Application No. 10-2018-0115106 filed on Sep. 27, 2018, the entire contents of which are incorporated herein for all purposes by this reference.

BACKGROUND

Field of the Disclosure

The present disclosure relates to a method and an apparatus for controlling a motor for a speed regulator power window, and more particularly, to a method and an apparatus for controlling a motor for a speed regulator power window, which actively varies an operating speed of a vehicle window by changing an output thereof based on an external environmental condition.

Description of the Related Art

In a door of a vehicle, a window for indoor ventilation or blocking from the outside is provided. Such a window may be a manual window that is opened/closed through operation of a handle provided inside the door, or a power window that is automatically opened/closed using motor driving using a switch operation. The power window is a system in which a relay is in a contact state by a user's switch operation or manipulation to output a voltage that corresponds to an electric potential difference between both terminals of the motor, and through this, the motor is driven to move the motorized window to ascend or descend.

Typically, a power window being is used as an automatic vertical power window provided with a function in which the window completely ascends/descends when the switch is operated once. However, such a general power window has drawbacks that motor driving sound, relay operation sound, and impact sound may occur when the window is opened/closed since the window has a constant operating speed until the window completely ascends/descends. Accordingly, a speed regulator power window system has been developed, which adjusts the speed of a motor based on an operation section of the window by variably outputting a voltage to the motor using a field-effect transistor (FET) instead of a relay.

In other words, when a user operates the switch once, a reduced voltage is output in an initial operation section, the output voltage is then gradually increased in a linear manner, a high voltage is output in a middle operation section, and then the output voltage is gradually decreased in a last operation section. Accordingly, the window moves with a reduced initial speed when the switch is operated, the operating speed of the window is gradually linearly increased in the initial operation section after the switch is operated, the window moves at a maximum speed in the middle operation section, and then the operating speed of the window is linearly decreased in a last operation section to stop the operation of the window.

However, when the operating speed of the window is decreased by unconditionally decreasing the output of the motor in the initial operation section without considering an external environmental condition, the initial operation of the window may not be smoothly performed, or the amount of external foreign substances flowing into a vehicle may be greatly increased, to deteriorate merchantability. In other words, if outdoor air is at a high temperature that is equal to or greater than a predetermined temperature, a glass run channel that is made of rubber may melt causing the window to stick to the glass run channel, and if the motor is driven with a low output in such a situation, sticking force by the glass run channel may become higher than an operation torque of the motor causing the initial operation of the window to be impossible.

In contrast, if the outdoor air is at a low temperature that is less than the predetermined temperature, the window system may be frozen, and if the motor is driven with a low output in such a situation, resistant force by the freezing may become higher than the operation torque of the motor causing the initial operation of the window to be impossible. Further, if the window operates at a low initial operating speed since the motor is driven with the low output in a situation that the external environmental condition is a poor weather condition (e.g., snowy or rainy condition), the amount of the external foreign substances (e.g., snow or rain) is greatly increased.

The foregoing is intended merely to aid in the understanding of the background of the present disclosure, and is not intended to mean that the present disclosure falls within the purview of the related art that is already known to those of ordinary skill in the art.

SUMMARY

The present disclosure provides a method and an apparatus for controlling a motor for a speed regulator power window, which may improve quality and merchantability by actively varying an output of a motor based on an external environmental condition and by actively varying an operating speed of a vehicle window accordingly.

In order to achieve the above object, a method for controlling a motor for a speed regulator power window according to the present disclosure may include detecting an external environmental state of a vehicle when a power is applied to electronic devices of the vehicle; comparing the result of the detection with a configured reference condition; and adjusting an output of the motor for the power window to be a maximum output in response to determining that the external environmental state of the vehicle coincides with a configured reference condition as the result of the comparison.

The method may further include adjusting the output of the motor for the power window to operate the window at a speed set by a user in response to determining that the external environmental state of the vehicle does not coincide with the configured reference condition. The current external environmental state of the vehicle may be detected using a rain sensor and an ambient temperature sensor.

The current external environmental state of the vehicle may be determined to coincide with the configured reference condition in response to detecting rain or snow using the rain sensor. The current external environmental state of the vehicle may also be determined to coincide with the configured reference condition in response to determining that an ambient temperature detected by the ambient temperature sensor is equal to or greater than a maximum set temperature when rain or snow is not detected by the rain sensor.

The current external environmental state of the vehicle may be determined to coincide with the configured reference condition in response to determining that an ambient temperature detected by the ambient temperature sensor is equal to or less than a minimum set temperature when rain or snow is not detected by the rain sensor. Additionally, the current external environmental state of the vehicle may be determined to not coincide with the configured reference condition in response to determining that an ambient temperature detected by the ambient temperature sensor is a temperature between a maximum set temperature and a minimum set temperature when rain or snow is not detected by the rain sensor. The window may be operated at one of a normal speed, a high speed, and a low speed set by a user in response to determining that the current external environmental state of the vehicle does not coincide with the configured reference condition.

In particular, normal speed may be a reference speed set during vehicle shipping, and when the normal speed is set, the output of the motor for the power window may be adjusted by a reference output set during the vehicle shipping. The high speed may be an increased speed that is greater than the normal speed, and when the high speed is set, the output of the motor for the power window may be adjusted to be greater than that set for the normal speed in initial, middle, and last operation sections of the window, and the operation of the window may be adjusted so that lengths of the initial and last operation sections are shorter than those set for the normal speed. The low speed may be a decreased speed that is less than the normal speed, and when the low speed is set, the output of the motor for the power window may be adjusted to be less than that set for the normal speed in the initial, middle, and last operation sections of the window, and the operation of the window may be adjusted so that the lengths of the initial and last operation sections are longer than those set for the normal speed. A reference output applied when the normal speed is set may include the output of the motor for the power window and the lengths of the operation sections of the window in the initial, middle, and last operation sections of the window.

An apparatus for controlling a motor for a speed regulator power window according to the present disclosure may include a power window switch configured to be operated for a vertical (e.g., ascend/descend) operation of a window; a sensor unit configured to detect a current external environmental state or an environmental condition of a vehicle; an input unit configured to set an operating speed of the window to a particular set value based on user input; a controller configured to determine a current position of the window through reception of signals transferal from the power window switch, the sensor unit, and the input unit, and configured to output a control signal for operating the window; and a field effect transistor (PET) configured to supply an output voltage to a power window motor or to block the output voltage supplied to the power window motor based on the window operation signal output from the controller.

The sensor unit may include a rain sensor configured to detect snow or rain, and an ambient temperature sensor configured to detect an ambient temperature. The input unit may include an audio video navigation (AVN), and the operating speed of the window may be set to be separated into a normal speed, a high speed, and a low speed in accordance with an input of the input unit.

The controller may be configured to determine the current position of the window through reception of a signal transferred from a hall sensor provided on the power window motor, to output a PWM signal for maintaining a driving current that is supplied to the power window motor at a predetermined level after gradually increasing the driving current up to the predetermined level when the power window switch is turned on, to output a PWM signal for blocking the driving current that is supplied to the power window motor by gradually decreasing the driving current to a predetermined level when the power window switch is turned off, and to output a PWM signal for stopping the window in response to determining that the window is positioned proximate to an uppermost end or a lowermost end when the power window switch is turned on.

According to an exemplary embodiment of the present disclosure, the system, in which the operating speed of the vehicle window is varied in accordance with the output of the motor, is configured to operate the motor for the power window with the maximum output when the user operates the switch in response to detecting rain or snow or in response to determining that the ambient temperature is equal to or greater than the maximum set temperature or in response to determining that the ambient temperature is equal to or less than the minimum set temperature in consideration of the external environmental state of the vehicle. Accordingly, the initial operation of the window may be performed smoothly, and in particular, the external foreign substances (snow or rain) may be maximally prevented from flowing into the vehicle.

Further, according to the present disclosure, the system may be configured to adjust the output of the motor to thus adjust the operating speed of the window to become one of the normal speed, the high speed, and the low speed set by the user in response to determining that the ambient temperature is a temperature between the maximum set temperature and the minimum set temperature when rain or snow is not detected based on the external environmental state of the vehicle. Accordingly, improvement of the quality and merchantability may be achieved through the variable speed control of the window.

BRIEF DESCRIPTION OF THE DRAWINGS

The above and other objects, features and advantages of the present disclosure will be more clearly understood from the following detailed description taken in conjunction with the accompanying drawings, in which:

FIGS. 3 and 4 are a graph and a diagram illustrating a normal speed, a high speed, and a low speed of a window set by a user in a method for controlling a motor according to an exemplary embodiment of the present disclosure.

DETAILED DESCRIPTION

Figure 1:
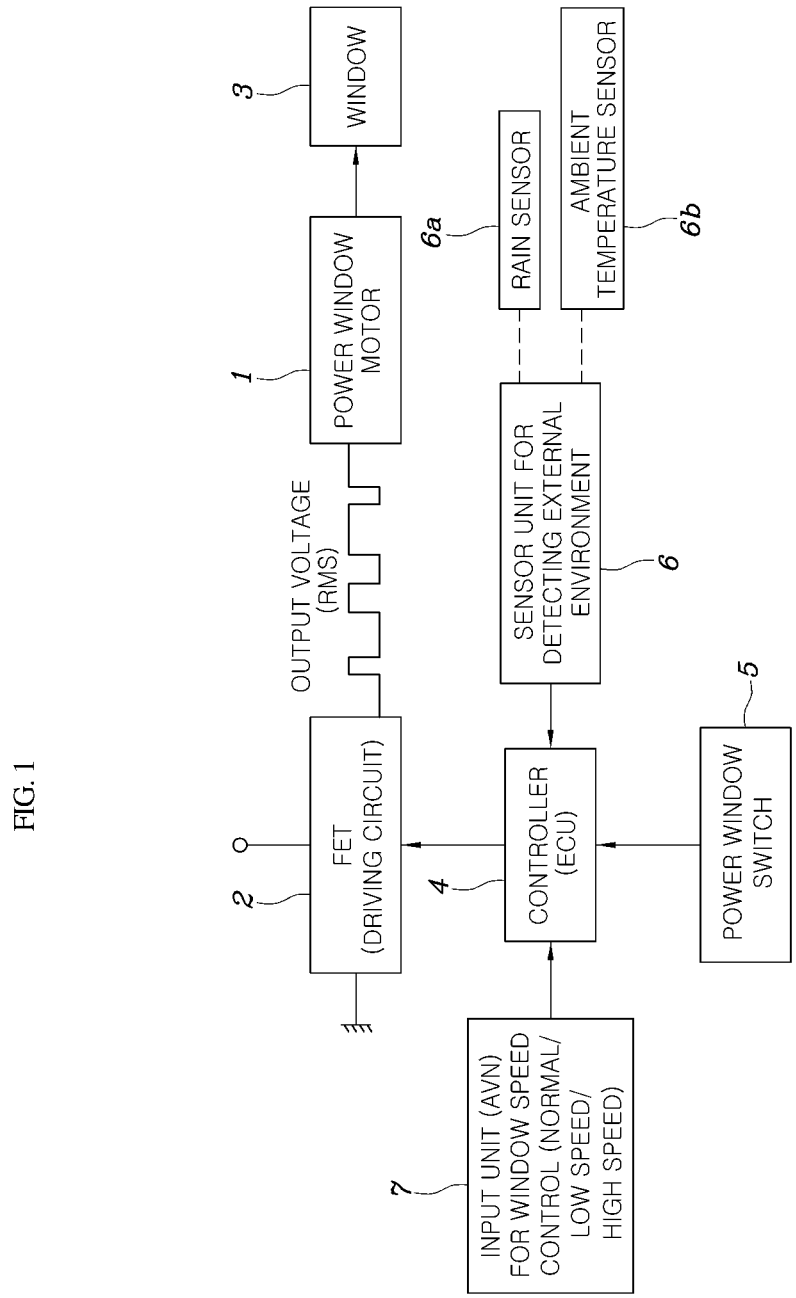
FIGS. 1 and 2 are a schematic block diagram and a flowchart illustrating a method for controlling a motor for a speed regulator power window according to an exemplary embodiment of the present disclosure.
Figure 2:
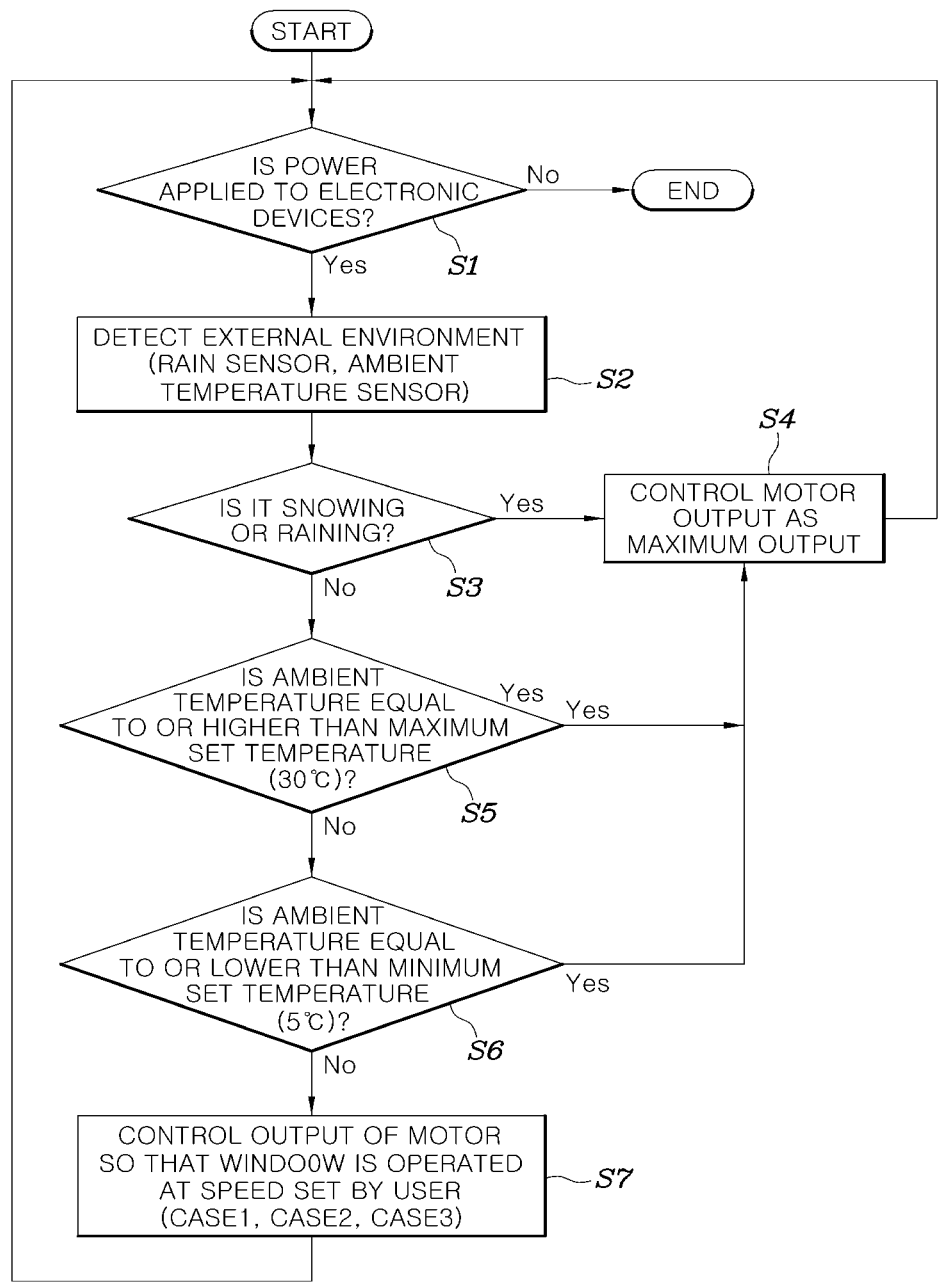

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a method and an apparatus for controlling a motor for a speed regulator power window according to exemplary embodiments of the present disclosure will be described with reference to the accompanying drawings.

In an exemplary embodiment of the present disclosure, a speed regulator power window system variably adjusts a driving speed of a window through variable control of a motor output based on an external environmental state of a vehicle, and through this, an initial operation of the window may be performed more smoothly when an ambient temperature is a high temperature or a low temperature, and in particular, the window may be closed rapidly by decreasing of an operation time of the window when rain or snow is detected.

Referring to FIG. 1, a power window motor 1 may be rotated forward or in reverse through reception of a specific voltage transferred from an PET 2, and through this, a window 3 of a vehicle may be opened or closed. The motor 1 may include a hall sensor configured to detect revolutions per minute (RPM) of the motor. A detection signal of the hall sensor may be used as basis data for determining whether the motor is in trouble, malfunctioning, or in error. The PET 2 may be configured to supply an output voltage to the motor 1 as gradually increasing the output voltage up to a predetermined level or gradually decreasing the output voltage down to a predetermined level or block the output voltage being supplied to the motor 1 based on a window-up PWM signal, a window-down PWM signal, or a window-stop PWM signal output from a controller 4.

The controller 4 may be configured to receive a signal transferred from the hall sensor via a local interconnect network (LIN) communication line of the vehicle, and determine the current position of the window 3 using the signal transferred from the hall sensor. The controller 4 may then be configured to output a PWM signal for maintaining a driving current that is supplied to the motor 1 at a predetermined level after gradually increasing the driving current up to the predetermined level when a power window switch (including an up-switch and a down-switch) 5 is turned on, and output a PWM signal for blocking the driving current that is supplied to the motor 1 by gradually decreasing the driving current down to a predetermined level when the switch 5 is turned off.

Further, the controller 4 may be configured to output a PWM signal for stopping the window 3 in response to determining that the window 3 is positioned proximate the uppermost end or the lowermost end when the switch 5 is turned on. The sensor unit 6 may include a plurality of sensors that are necessary to detect the current external environmental state (environmental condition) of the vehicle, such as, a rain sensor 6a configured to detect snow or rain and an ambient temperature sensor 6b configured to detect an ambient temperature. The input unit 7 may be configured to receive user input to set an operating (driving) speed of the window 3 to a particular set value, and may be referral to as an audio video navigation (AVN) device. The operating speed of the window 3 may be set to be separated into a normal speed, a high speed, and a low speed.

Hereinafter, a method for controlling a motor for a speed regulator power window according to the present disclosure will be described in detail with reference to FIGS. 1 to 4. The method described herein below may be executed by a controller having a processor and a memory. When an electric power is applied to electronic devices of the vehicle (step S1), the current external environmental state of the vehicle may be detected using the rain sensor 6a and the ambient temperature sensor 6b of the sensor unit 6 (step S2). The power application state of the electronic devices of the vehicle may include both an ACC state and an IGN-on state of a start switch.

After step S2, the current external environmental state of the vehicle detected by the sensor unit 6 may be compared with a configured reference condition, and in response to determining that the external environmental state of the vehicle coincides with or corresponds to the configured reference condition as the result of the comparison, the output of the motor 1 for the power window may be adjusted to become the maximum output. Accordingly, the output torque of the motor 1 may be maximized. In particular, in response to determining that the external environmental state of the vehicle coincides with the configured reference condition is as follows. First, the external environmental state may be determined to correspond to a reference condition in response to detecting rain or snow using the rain sensor 6a.

In other words, the rain or snow condition may be determined by detecting a rainfall or snowfall using the rain sensor 6a (step S3), and in response to detecting the current rain or snow condition outside of the vehicle, the motor 1 for the power window may be operated by the controller 4 to have the maximum output (step S4), and at that time, the output torque of the motor 1 may be maximized. Accordingly, in response to a user operating the power window switch 5 when rain or snow is detected outside of the vehicle, the power window motor 1 may be operated with a maximum output to operate the window 3 at a high speed, and thus the closing time of the window 3 may be decreased. Accordingly, the amount of external foreign substances (snow or rain) that flow into the vehicle may be reduced.

Second, the external environmental state may be determined to correspond to a reference condition in response to detecting that the ambient temperature detected by the ambient temperature sensor 6b is equal to or greater than the maximum set temperature when rain or snow is not detected by the rain sensor 6a. In other words, when rain or snow is not detected by the rain sensor 6a at step S3, whether the current ambient temperature of the vehicle detected using the ambient temperature sensor 6b is greater than the maximum set temperature may be determined (step S5), and when the current ambient temperature is greater than the maximum set temperature, the motor 1 for the power window may be operated by the controller 4 to have a maximum output (step S4), and at that time, the output torque of the motor 1 may be maximized. As an example, if the set temperature is determined to be in the range of about 5° C. to 30° C., the maximum set temperature may be about 30° C.

When the outdoor air is at a high temperature that is equal to or greater than about 30° C., there is a high possibility that a window glass run channel that is made of rubber may melt due to heat to cause the window to stick to the glass run channel. When the motor is driven with a low output in such a situation, sticking force by the glass run channels becomes higher than the operation torque of the motor thus causing the initial operation of the window to be impossible. Accordingly, in the present disclosure, in response to determining that the ambient temperature of the vehicle is equal to or greater than about 30° C. that is the maximum set temperature, the motor 1 for the power window may be operated with the maximum output to cause the output torque of the motor 1 to be maximized when the user operates the switch 5. Accordingly, the driving force of the motor 1 becomes higher than the sticking force by the glass run channel to cause the initial operation of the window 3 to be performed more smoothly.

Third, the external environmental state may be determined to correspond to a reference condition in response to detecting that the ambient temperature detected by the ambient temperature sensor 6b is equal to or less than the minimum set temperature when rain or snow is not detected by the rain sensor 6a. In other words, when rain or snow is not detected by the rain sensor 6a at step S3, whether the current ambient temperature of the vehicle detected through the ambient temperature sensor 6b is greater than the maximum set temperature may be determined (step S5). In response to determining that the current ambient temperature is equal to or less than the maximum set temperature, whether the current ambient temperature of the vehicle is less than the minimum set temperature may be determined again (step S6).

In response to determining that the current ambient temperature of the vehicle is less than the minimum set temperature as the result of the determination at step S6, the motor 1 for the power window may be operated by the controller 4 to have a maximum output (step S4), and at that time, the output torque of the motor 1 may be maximized. As an example, when the set temperature is determined to be in the range of about 5° C. to 30° C., the maximum set temperature may be about 30° C.

When the outdoor air is at a low temperature that is less than about 5° C., there is a high possibility that the window system is frozen, and when the motor is driven with a low output in such a situation, resistant force by the freezing may become greater than the operation torque of the motor to thus cause the initial operation of the window to be impossible. Accordingly, in the present disclosure, in response to determining that the ambient temperature of the vehicle is equal to or less than about 5° C. that is the minimum set temperature, the motor 1 for the power window may be operated with the maximum output to cause the output torque of the motor 1 to be maximized when the user operates the switch 5, and accordingly, the driving force of the motor 1 becomes greater than the resistant force by the freezing to cause the initial operation of the window 3 to be performed more smoothly.

On the other hand, in response to determining that the external environmental state of the vehicle does not coincide with the set reference condition as the result of comparing the current external environmental state of the vehicle detected by the sensor unit 6 at step S2 with the set reference condition, the controller 4 may be configured to transmit a control signal to the PET 2 to operate the window 3 with a value set by the user using the input unit 7, and the PET 2 may be configured to the signal transferred from the controller 4 to supply the output voltage to the motor 1 (step S7). In particular, in response to determining that the external environmental state of the vehicle does not coincide with the set reference condition corresponds to when the ambient temperature detected by the ambient temperature sensor 6b is detected as a temperature between the maximum set temperature and the minimum set temperature when rain or snow is not detected by the rain sensor 6a.

Further, the user may set the operating speed of the window 3 to be separated into a normal speed, a high speed, and a low speed by operating the input unit (AVN) 7, and set values may be stored in the memory of the controller 4. Accordingly, in response to determining that the external environment state of the vehicle does not coincide with the set reference condition at step S2, that is, in response to determining that it is not currently raining or snowing, and the ambient temperature is the temperature between the maximum set temperature (e.g., about 30° C.) and the minimum set temperature (e.g., about 5° C.), the window 3 may be operated at one of the normal speed, the high speed, and the low speed through the output of the motor 1 for the power window when the user operates the switch 5.

The normal speed, the high speed, and the low speed may be defined as follows with reference to FIGS. 3 and 4. The normal speed may be a reference speed set during vehicle shipping, and when the normal speed is set, the output of the motor 1 for the power window may be adjusted by a reference output set during the vehicle shipping. The normal speed may be the reference speed set during the vehicle shipping, and it may be assumed that the motor output at an initial operation time (A position) of the window 3 during the operation of the switch 5 is aV, a time for a section (A-B section) in which the voltage is linearly increased is bms, the motor output in a middle section (maximum output section, B-C section) is cV, a voltage drop start time (C position, point that is spaced apart for a predetermined distance from the point at which the window is fully opened) is dcm, a time for a section (C-D section) in which the voltage is linearly dropped is ems, and the motor output in a last window operation section (D-E section) is fV.

It may be defined that the initial window operation section is a section in which the voltage is linearly increased, the middle section is a section in which the voltage is maintained constant, and the last operation section is a section in which the voltage is linearly decreased. The terms a, b, c, d, e, and f are constants having predetermined values, V is the unit of voltage, ms is the unit of time, and cm is the unit of length. As an example, it may be assumed that aV=8V, bms=300 ms, cV=11V, dcm=4 cm, ems=50 ms, and fV=4V, and in the graph of FIG. 3, line L corresponds to the normal speed.

The high speed is an increased speed that is greater than the normal speed, and if the high speed is set, the output of the motor 1 for the power window may be adjusted to be greater than that set for the normal speed in initial, middle, and last operation sections of the window, and the operation of the window 3 may be adjusted so that lengths of the initial and last operation sections are shorter than those set for the normal speed. At the high speed, as compared with the normal speed, the motor outputs at the initial operation time (A1 position) and in the last operation section (D1-E1 section) may be adjusted to be increased, the length of a voltage increasing section (A1-B1 section) and the length of a voltage dropping section (C1-D1 section) may be reduced to be shortened, and the maximum motor output may be adjusted to be increased.

In other words, at the high speed, as compared with the normal speed, control may be performed so that the motor output at an initial operation time (A1 position) of the window 3 during the operation of the switch 5 is a+x1V, a time for a section (A1-B1 section) in which the voltage is linearly increased is b-x2 ms, the motor output in a middle section (maximum output section, B1-C1 section) is c+x3V, a voltage drop start time (C1 position, point that is spaced apart for a predetermined distance from the point at which the window is fully opened) is d-x4 cm, a time for a section (C1-D1 section) in which the voltage is linearly dropped is e-x5 ms, and the motor output in a last window operation section (D1-E1 section) is f+x6V.

Figure 3:
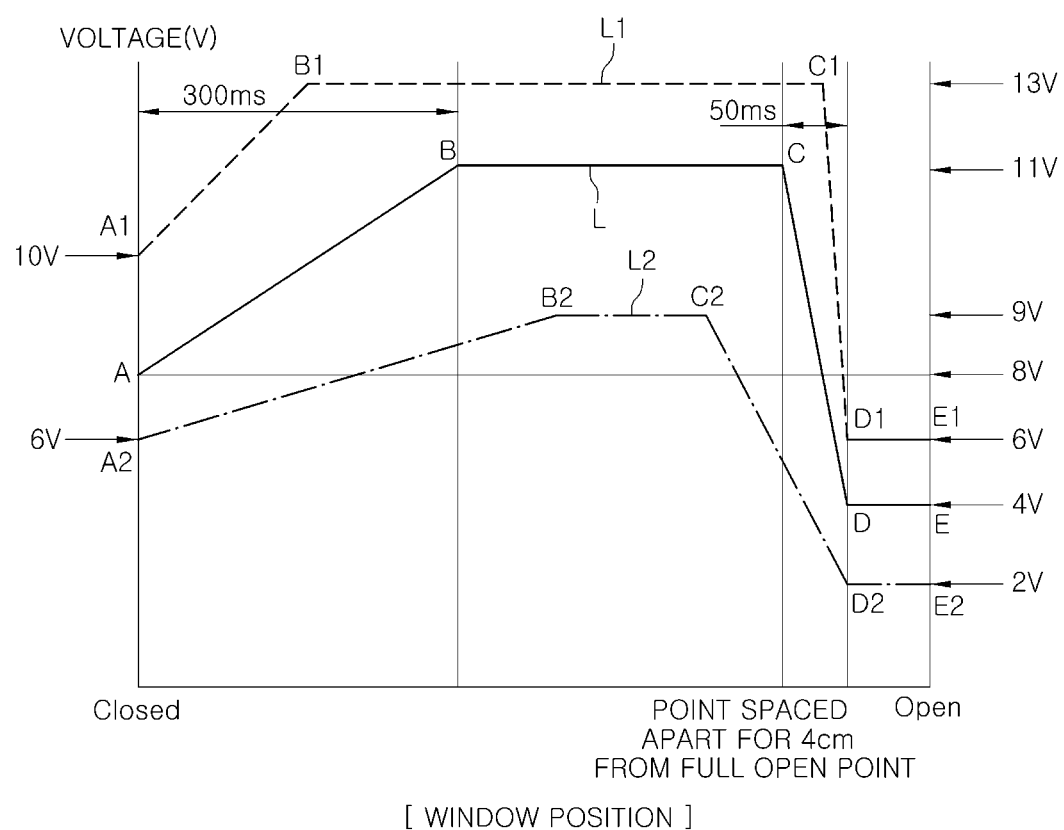

The terms x1, x2, x3, x4, x5, and x6 are constants having predetermined values, and as an example, it may be determined that a+x1V=10V, b-x2 ms=150 ms, c+x3V=13V, d-x4 cm=2 cm, e-x5 ms=25 ms, and f+x6V=6V, and in the graph of FIG. 3, line L1 corresponds to the high speed.

Further, the low speed is a decreased speed that is less than the normal speed, and when the low speed is set, the output of the motor 1 for the power window may be adjusted to be less than that set for the normal speed in the initial, middle, and last operation sections of the window, and the operation of the window 3 may be adjusted so that the lengths of the initial and last operation sections are greater than those set for the normal speed. At the low speed, as compared with the normal speed, the motor outputs at the initial operation time (A2 position) and in the last operation section (D2-E2 section) may be adjusted to be decreased, the length of a voltage increasing section (A2-B2 section) and the length of a voltage decrease section (C2-D2 section) may be increased, and the maximum motor output may be adjusted to be decreased.

In other words, at the low speed, as compared with the normal speed, control may be performed so that the motor output at an initial operation time (A2 position) of the window 3 during the operation of the switch 5 is a-y1V, a time for a section (A2-B2 section) in which the voltage is linearly increased is b+y2 ms, the motor output in a middle section (maximum output section, B2-C2 section) is c-y3V, a voltage drop start time (C2 position, point that is spaced apart for a predetermined distance from the point at which the window is fully opened) is d+y4 cm, a time for a section (C2-D2 section) in which the voltage is linearly dropped is e+y5 ms, and the motor output in a last window operation section (D2-E2 section) is f-y6V. The terms y1, y2, y3, y4, y5, and y6 are constants having predetermined values, and as an example, it may be determined that a-y1V=6V, b+y2 ms=600 ms, c-y3V=9V, d+y4 cm=6 cm, e+y5 ms=75 ms, and f-y6V=2V, and in the graph of FIG. 3, line L2 corresponds to the low speed.

As described above, according to the exemplary embodiment of the present disclosure, the system, in which the operating speed of the vehicle window 3 may be varied in accordance with the output of the motor 1, is configured to operate the motor 1 for the power window with the maximum output when the user operates the switch 5 in response to detecting rain or snow or the ambient temperature is equal to or greater than the maximum set temperature or the ambient temperature is equal to or less than the minimum set temperature based on the external environmental state of the vehicle. Accordingly, the initial operation of the window 3 may be performed more smoothly, and in particular, the external foreign substances (snow or rain) may be maximally prevented from invading into the vehicle.

Further, according to the present disclosure, the system may be configured to adjust the output of the motor 1 to adjust the operating speed of the window 3 to be one of the normal speed, the high speed, and the low speed set by the user in response to determining that the ambient temperature is the temperature between the maximum set temperature and the minimum set temperature when rain or snow is not detected based on the external environmental state of the vehicle. Accordingly, improvement of the quality and merchantability may be achieved through the variable speed control of the window 3.

Although the exemplary embodiments of the present disclosure have been illustrated and described for illustrative purposes, those of ordinary skill in the art will appreciate that various modifications, additions and substitutions are possible, without departing from the scope and spirit of the invention as disclosed in the accompanying claims.

What is claimed is:

1. A method for controlling a motor for a speed regulator power window, comprising:
    detecting, by a controller, an external environmental state of a vehicle when a power is applied to electronic devices of the vehicle;
    comparing, by the controller, the detected external environmental state of the vehicle with a configured reference condition; and
    adjusting, by the controller, an output of the motor for the power window to be a maximum output in response to determining that the external environmental state of the vehicle coincides with the configured reference condition,
    wherein the external environmental state of the vehicle is detected using a rain sensor and an ambient temperature sensor,
    wherein the window is operated at a normal speed, a high speed, or a low speed set by a user in response to determining that the external environmental state of the vehicle does not coincide with the configured reference condition, and
    wherein:
    the normal speed is a reference speed set during vehicle shipping, and if the normal speed is set, the output of the motor for the power window is adjusted by a reference output set during the vehicle shipping;
    the high speed is an increased speed that is greater than the normal speed, and if the high speed is set, the output of the motor for the power window is adjusted to be greater than that set for the normal speed in initial, middle, and last operation sections of the window, and the operation of the window is adjusted so that lengths of the initial and last operation sections are shorter than those set for the normal speed; and the low speed is a decreased speed that is less than the normal speed, and if the low speed is set, the output of the motor for the power window is adjusted to be less than that set for the normal speed in the initial, middle, and last operation sections of the window, and the operation of the window is adjusted so that the lengths of the initial and last operation sections are longer than those set for the normal speed;

wherein the external environmental state of the vehicle is determined to not coincide with the configured reference condition when an ambient temperature detected by the ambient temperature sensor is a temperature between a maximum set temperature and a minimum set temperature and rain or snow is not detected by the rain sensor.

2. The method according to claim 1, further comprising: adjusting, by the controller, the output of the motor for the power window to operate the window at a speed set by a user in response to determining that the external environmental state of the vehicle does not coincide with the configured reference condition.

3. The method according to claim 1, wherein the external environmental state of the vehicle is determined to coincide with the configured reference condition in response to determining that it is raining or snowing based on a detection by the rain sensor.

4. The method according to claim 1, wherein the external environmental state of the vehicle is determined to coincide with the configured reference condition in response to determining that an ambient temperature detected by the ambient temperature sensor is equal to or greater than a maximum set temperature when rain or snow is not detected by the rain sensor.

5. The method according to claim 1, wherein the external environmental state of the vehicle is determined to coincide with the configured reference condition in response to determining that an ambient temperature detected by the ambient temperature sensor is equal to or less than a minimum set temperature in a state when rain or snow is not detected by the rain sensor.

6. The method according to claim 1, wherein a reference output applied when the normal speed is set includes the output of the motor for the power window and the lengths of the operation sections of the window in the initial, middle, and last operation sections of the window.

7. An apparatus for controlling a motor for a speed regulator power window, comprising:
a power window switch configured to be operated for an up or down operation of a window;
a sensor unit configured to detect a current external environmental state or an environmental condition of a vehicle;
an input unit configured to receive an operating speed of the window;
a controller configured to determine a current position of the window through reception of signals transferred from the power window switch, the sensor unit, and the input unit, and configured to output a control signal for operating the window; and a field-effect transistor (FET) configured to supply an output voltage to a power window motor or to block the output voltage supplied to the power window motor based on the window operation signal output from the controller, wherein the sensor unit includes: a rain sensor configured to detect snow or rain; and an ambient temperature sensor configured to detect an ambient temperature, wherein the window is operated at a normal speed, a high speed, or a low speed set by a user in response to determining that the external environmental state of the vehicle does not coincide with the configured reference condition, and wherein:

the normal speed is a reference speed set during vehicle shipping, and if the normal speed is set, the output of the motor for the power window is adjusted by a reference output set during the vehicle shipping;

the high speed is an increased speed that is greater than the normal speed, and if the high speed is set, the output of the motor for the power window is adjusted to be greater than that set for the normal speed in initial, middle, and last operation sections of the window, and the operation of the window is adjusted so that lengths of the initial and last operation sections are shorter than those set for the normal speed; and the low speed is a decreased speed that is less than the normal speed, and if the low speed is set, the output of the motor for the power window is adjusted to be less than that set for the normal speed in the initial, middle, and last operation sections of the window, and the operation of the window is adjusted so that the lengths of the initial and last operation sections are longer than those set for the normal speed;

wherein the external environmental state of the vehicle is determined to not coincide with the configured reference condition when an ambient temperature detected by the ambient temperature sensor is a temperature between a maximum set temperature and a minimum set temperature and rain or snow is not detected by the rain sensor.

8. The apparatus according to claim 7, wherein the input unit includes an audio video navigation (AVN), and the operating speed of the window is set to be separated into a normal speed, a high speed, and a low speed in accordance with an input of the input unit.

9. The apparatus according to claim 7, wherein the controller is configured to:
determine the current position of the window through reception of a signal transferred from a hall sensor provided on the power window motor;
output a PWM signal for maintaining a driving current that is supplied to the power window motor at a predetermined level after gradually increasing the driving current up to the predetermined level when the power window switch is turned on;
output a PWM signal for blocking the driving current that is supplied to the power window motor by gradually decreasing the driving current down to a predetermined level when the power window switch is turned off; and
output a PWM signal for stopping the window in response to determining that the window is positioned proximate to an uppermost end or a lowermost end when the power window switch is turned on.

* * * * *